Figure 1:
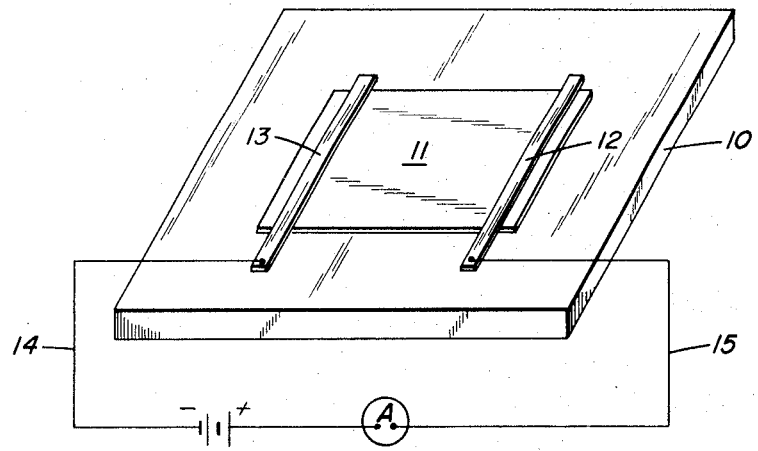

United States Patent [19]
Deb

[11] 3,829,196
[45] Aug. 13, 1974

[54] VARIABLE LIGHT TRANSMISSION DEVICE
[75] Inventor: Satyendra Kumar Deb, Stamford, Conn.
[73] Assignee: American Cyanamid Company, Stamford, Conn.
[22] Filed: Apr. 10, 1973
[21] Appl. No.: 349,878

Related U.S. Application Data
[63] Continuation of Ser. No. 110,068, Jan. 27, 1971, abandoned, which is a continuation-in-part of Ser. No. 616,791, Feb. 17, 1967, abandoned, which is a continuation-in-part of Ser. No. 530,086, Feb. 25, 1966, abandoned.

[52] U.S. Cl. .............................. 350/160 R
[51] Int. Cl. .............................. G02f 1/36
[58] Field of Search .................. 350/160 R

[56] References Cited
UNITED STATES PATENTS
2,809,316  10/1957  Jeges .................. 350/160 R
2,928,075  3/1960  Anderson .................. 350/160 R
3,152,215  10/1964  Barstow et al. .................. 350/160 R
3,271,578  9/1966  Bockemuehl .................. 350/160 R
3,283,656  11/1966  Jones et al. .................. 350/160 R
3,443,857  5/1969  Warter, Jr. .................. 350/160 R
3,443,859  5/1969  Rogers .................. 350/160 R
3,460,884  8/1969  Heller .................. 350/160 R
3,462,712  8/1969  Boddy et al. .................. 350/160 R Primary Examiner—Vincent P. McGraw
Attorney, Agent, or Firm—Charles Joseph Fickey

[57] ABSTRACT

Variable light transmission device typically comprising a transition metal oxide layer sandwiched between a pair of electrode layers such as stannic oxide-coated glass and gold film. When an electric field is applied across the electrodes the device exhibits persistent coloration at ambient temperature.

11 Claims, 2 Drawing Figures

PATENTED AUG 13 1974          3,829,196

INVENTOR.
SATYENDRA KUMAR DEB
BY
Charles J. Fickey
ATTORNEY

VARIABLE LIGHT TRANSMISSION DEVICE

This is a continuation of application Ser. No. 110,068, filed Jan. 27, 1971, now abandoned; which was a continuation-in-part of Ser. No. 616,791, filed Feb. 17, 1967, now abandoned; which was a continuation-in-part of Ser. No. 530,086, filed Feb. 25, 1966, now abandoned.

This invention relates to variable light transmission devices and to processes for providing persistent variable light transmission effects.

The term "variable light transmission device" or like term is intended herein to mean electro-optical devices characterized by capability of modulating the normal light absorptions detected by the unaided eye or by known sensing means, e.g., photoelectric detectors, and the like. The term "light" is thus used in a broad sense and includes electromagnetic radiation of any wavelength, whether visible or invisible to the human eye.

Studies of the optical properties of solid state materials have in recent years provided variable light transmission devices useful for data display, decoration, windows, specialized photocopying, information storage, filters, light modulators, electromagnetic radiation detection, and the like. For example, it is known that certain compounds when incorporated into plastic film provide photochromism, i.e., coloration induced by exposure to required activating wavelengths of light such as ultraviolet, said coloration being eraseable by means such as heat or light.

Color changes have also been observed in solid materials when the activating energy is an electric field. Thus, it is known that alkali halide crystals, colored additively, electrolytically, or by exposure to X-ray irradiation, may be bleached by application of an electirc field at elevated temperature. See "Color Centers in Solids," J. H. Schulman and W. D. Compton, Macmillan, New York (1962).

Electric fields are also known to cause shift to the red of absorption bands of methyl red or phenol blue dispersed in polystrene matrices. The effect has been termed "electrochromism" and explained as a classical Stark effect. See Kumamoto et al., *J. Chem. Phys.*, 36, 2893 (1962) and *J. Am. Chem. Soc.*, 86, 1004 (1964).

Related to the Stark effect is the shift, called the Franz-Keldysh effect, of the fundamental absorption edge to the low energy side of the spectrum of certain solid semi-conducting and insulating materials subjected to a very high electrical field. However, the shift in absorption edge, which in some cases might induce a color change, is very small and disappears instantaneously upon removal of the field.

Another case of color change in a solid is the electric field-induced brown coloration in rutile titanium dioxide single crystals containing iron as a major impurity. The behavior of the color centers, except for polarity, is the same as that observed in the alkali halide crystals at higher temperature, i.e., movement of the color centers toward the other electrode when the field is reversed, with gradual fading and reappearance at the opposite electrode. See van Raalte, *J. Appl. Phys.*, 36, No. 11 (Nov. 1965), 3365.

As distinguished from the foregoing, particularly Stark or Franz-Keldysh effects which involve shifting of existing absorption bands or spectral lines, the present invention provides as a variable light transmission device, the combination of a negative electrode, a positive electrode, and a persistent electrochromic material effective at ambient temperature, that is, a material in whcih at ambient temperature an electric field produces electromagnetic radiation absorption of wavelength not previously appreciably absorbed or erases existing electromagnetic radiation absorption.

Far reaching benefits result from the instant invention. Thus, the present device gives substantially more persistent absorption, particularly in the visible, which may be produced more rapidly, at ambient temperatures, and at smaller applied potential than is reported in the aforementioned publications. Hence, particularly as a consequence of the electrically induced absorption, the devices of the invention provide convenient and attractive modes of operation in variable light transmission systems such as data display.

The persistent electrochromic materials of the device in general are electrical insulators or semi-conductors. Thus are excluded those metals, metal alloys, and other metal containing compounds which are relatively good electrical conductors.

While not wholly understood, it appears that the materials contain in non-stoichiometric proportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements); materials containing non-alkali metal elements such as copper, tin and barium; and materials containing an alkali metal element with a variable oxidation state element. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IVB, VB and VIB of the Periodic System, and Lanthanide series metal oxides and sulfides. Examples of such are copper stannate, tungsten oxide, molybdenum oxide, titanium oxide, vanadium oxide, niobium oxide, cerium oxide, cobalt tungstate, metal molybdates, metal titanates, metal niobates, and the like.

Additional examples of such compounds are the following oxides: MO oxides, e.g., $ZnO$, $CdO$, $BaO$, $MgO$, $MnO$, $PbO$, $NiO$, $CoO$, etc.; $M_2O_3$ oxides, e.g., $Pb_2O_3$, $Cr_2O_3$, $Fe_2O_3$, $Y_2O_3$, $Yb_2O_3$, $V_2O_3$, $Al_2O_3$, $Ti_2O_3$, $Sb_2O_3$, $As_2O_3$, $Mn_2O_3$, etc.; $MO_2$ oxides, e.g., $TiO_2$, $SnO_2$, $PbO_2$, $ZnO_2$, $SiO_2$, $MnO_2$, $ThO_2$, $CrO_2$, etc.; $M_3O_4$ oxides, e.g., $Pb_3O_4$, $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides, e.g., $Sb_4O_6$, $As_4O_6$, etc.; $M_2O_7$ oxides such as $Mn_2O_7$; complex oxides such as those of the formula $XYO_2$ (X and Y being different metals), e.g., $LiNiO_2$, $LiInO_2$, etc.; $XYO_3$ oxides, e.g., $LiMnO_3$, $FeTiO_3$, $LiSbO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_6$, etc.; $XY_2O_6$, e.g., $CaNb_2O_6$ ("Niobite" oxides); $X_2Y_2O_6$, e.g., $Na_2Nb_2O_6$; Spinal structure oxides, i.e., of the formula $XY_2O_4$, e.g., $MgAl_2O_4$, $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, $Ba_2PBO_4$, etc.; $X_2YO_5$ oxides, e.g., $FeTiO_3$, $Al_2TiO_5$, etc.; and $X_3Y_3O$ (ternary) oxides, e.g., $Mo_3Fe_3O$, $W_3Fe_3O$, $X_3Ti_3O$ (where X is Mn, Fe, Co, etc.). Also included are nitrides, e.g., BN, AlN; azides such as $TlN_3$; phosphates including pyrophosphates and polyphosphates; silicates; borates; and the sulfides corresponding to the above oxides.

It has further been discovered that the rate of bleaching of the foregoing electrochromic materials (in which coloration or other absorption has been induced previously) is increased by doping. For example, a film of tungsten oxide, onto which has been evaporated 0.4% by weight of metallic silver, bleaches substantially in a few minutes as compared with several hours for undoped film.

While the bleaching process is not fully understood, it is believed that the doping material facilitates the emptying of the electronic absorption level, newly formed in the material and filled with electrons or holes by the electric field, of trapped electrons or holes. Consequently, other metals which will readily diffuse into the compound film of the invention may enhance bleaching since metals readily trap electrons. Such metals include the noble metals, e.g., silver, gold, and platinum, alkali metals, and alkaline earth metals. From about 0.01% to 1.0%, preferably 0.1% to 0.5%, by weight of doping metal is effective.

Non-stoichiometry resulting in lattice defects is induced by several methods. For example, excess cation or anion can be introduced by heating the electrochromic material in the vapor of the constituent to be introduced and also by introducing anions or cations of higher or lower valence. Anion deficiency can also be caused by the method of preparing films of the electrochromic material. Thus, by vacuum deposition onto a substrate such as glass, some of the oxygen in a metal oxide is lost. The same effect can be achieved by controlled reduction of a film previously deposited by some other method. In yet another method, a metal halide is dissolved in a suitable solvent, preferably with a peroxide compound, and the solution applied to a substrate. The film is then heated at a temperature effective to volatilize the solvent, whereby the halide converts substantially to the oxide. Of the foregoing methods, vacuum deposition is preferred since it provides a convenient method of controlling optical qualities such as clarity and uniformity of thickness and composition.

As a result of the aforementioned non-stoichiometry and application of an electric field, it is believed that electrons (negative charges) and holes (positive charges) are injected into conduction bands and subsequently trapped by the empty states associated with the lattice defects.

These empty states appear to be stable electronic energy levels between the conduction band and valence band of the compound in question as evidenced by electronic absorption band spectra.

In the terms of an electrochromic material wherein the non-stoichiometry provides anion vacancies, it appears that the electric field injects valence electrons into the conduction band, as evidenced by increased conductivity of the material. One or more conduction band electrons may then fall into the newly created energy level. The effect of this transfer is a new absorption band which, if in the visible, causes the appearance of color centers in the material.

As already mentioned, the invention is not limited to devices which show new absorptions in the visible spectrum. Thus, infra red, ultra violet absorptions, and other absorptions in the electromagnetic spectrum, are readily detectable by conventional sensing devices. It will therefore be evident that choice of persistent electrochromic material will be dictated by the spectral range of new absorptions desired for practical application of the devices of the invention. If visible transmission or reflection is required, as in data display, advertising, and the like, electrochromic materials will be chosen which exhibit new absorptions in the visible in an electric field. Likewise, if only ultra violet transmission or reflection is desired, as for confidential information, electrochromic materials which demonstrate new absorptions in an electric field permitting such transmission or reflection will be employed.

By reversing the original polarity of the field or by applying a new field, it is also possible to cancel, erase, or bleach detectable electromagnetic absorption which has previously been caused in the electrochromic materials by any of several methods, including additive coloration, electrolytic coloration, coloration caused by heat, ionizing radiation or an electric field, and, in general, by any means whereby color centers are induced in the electrochromic materials.

The electrochromic materials preferably are employed as layers or films of thickness in the range of from about 0.1–100 microns. However, since a small potential will provide an enormous field strength across very thin films, the latter, i.e., 0.1–10 microns, are preferred over thicker ones. Optimum thinness will also be determined by the nature of the particular electrochromic materials and by the film-forming method since the particular material and film-forming method may place physical (e.g., non-uniform film surface) and economic limitations on manufacture of the devices.

The films may be self-supporting, depending on thickness and film material, or may be laid down on any substrate which, relative to the film, is electrically non-conducting. Suitable substrate materials include glass, wood, paper, plastics, plaster, and the like, including transparent, translucent, opaque or other optical quality materials.

The negative and positive electrodes need only be in electrical contact with the electrochromic material. Any type and arrangement of electrodes effective to impose an electric field on the electrochromic material, when the electrodes are connected to a voltage source, will be suitable. Thus, the electrodes may be spaced conducting strips deposited on or imbedded in the electrochromic material or they may be conducting layers between which the electrochromic material is inserted.

A great variety of electrode materials are suitable, including the common metals, metal alloys, and composites such as "conducting glass," e.g., glass coated with a stannic oxide film. Similarly to substrate materials, the electrodes may exhibit varying degrees of optical quality.

An important advantage of devices of the invention is operability at ambient temperature, i.e., temperatures normally encountered in the fields of use of the devices such as described hereinafter, e.g., −50°C. to 125°C. So far as is known, this is the first instance of electrochromic behavior at temperatures of practical application. In most instances, moreover, the devices are also operable outside of normal temperatures, e.g., above 125°C. and below −50°C. The invention, therefore, permits numerous practical applications to which prior art electro-optical devices are not susceptible as will be evident from the ensuing description.

Figure 2:
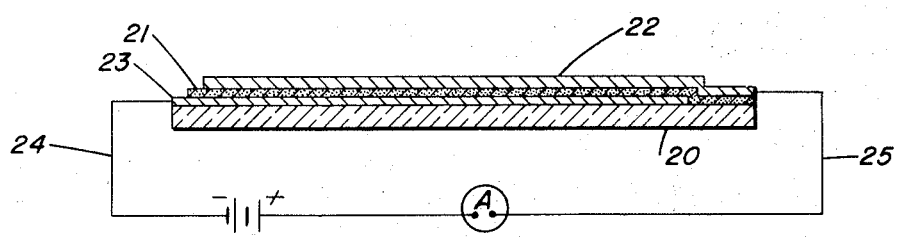

FIGS. 1 and 2 illustrate typical devices of the invention. The device of FIG. 1 is prepared, for example, by vacuum evaporating molybdenum oxide from an electrically heated molybdenum boat at a pressure of $1.0 \times 10^{-5}$ Torr. onto a glass plate 10 to form a film 11 of thickness in the range 0.4 to 2.0 microns. Gold electrodes 12 and 13 are then deposited on the surface of the film and connected by leads 14 and 15 to a voltage source and ammeter. On applying a direct current electric field of $9.0 \times 10^3$ volts per centimeter, blue coloration appears at the negative electrode and propagates towards the positive electrode. In about 45 minutes the complete space between the electrodes develops coloration which is substantially permanent on removal of the field. Associated with coloration is an increase in electrical dark conductivity.

When the electric field is reversed the coloration first disappears at the former positive electrode, with fading advancing towards the former negative electrode, followed by reappearance of coloration at the new negative electrode and propagation, as before, towards the new positive electrode. Thus, on field reversal, the coloration process is repeated.

As another illustration of the device of FIG. 1, copper molybdate is evaporated at room temperature and $10^{-5}$ millimeters pressure onto a glass plate 10 to give a film 11 of about 1.0 micron thickness. Silver electrodes 12 and 13 are then painted on the surface of film 11 at an inter-electrode spacing of 3 millimeters. On applying 2,000 volts at 60°C. by means of leads 14 and 15, substantially permanent blue coloration is formed in about 2 hours in the film space between the electrodes. The same film evidences photochromism, i.e., generation of blue coloration by ultra violet irradiation.

FIG. 2 shows in cross section another arrangement of the device of the invention, here in laminate or sandwich form. With reference thereto, 20 is any convenient non-conducting substrate, preferably of a transparent material such as glass, 21 is a tungsten oxide film of thickness in the range of about 0.5 to 5.0 microns, 22 is a first electrode layer, 23 is a second electrode layer, and 24 and 25 are connecting leads. The electrode layers may each be transparent or opaque but preferably at least one is transparent. When an electric field is applied, blue coloration appears with effects substantially as described with respect to FIG. 1 except that when the field is removed, the coloration is less permanent, slowly bleaching after several hours.

As a further illustration of the arrangement of FIG. 2, a thin film 21 of molybdenum oxide is deposited on a stannic oxide-coated glass substrate 20, said film being in contact with the stannic oxide electrode layer 23, and gold is deposited as an electrode layer 22 over the film. The area between the electrodes is 4 cm² and the thickness of the molybdenum oxide film is in the range 0.8 to 2.0 microns. About 100 milliamperes direct current and field of 20 volts is applied at room temperature to give a field strength of $2.5 \times 10^5$ volts per centimeter. Within a minute the film turns blue. The absorption spectrum of the induced color center band, as measured from the reflection spectrum, is similar to optically formed (photochromic) color centers.

Current density and voltage may be varied widely depending on the electrical characteristics of the device. For example, current densities of from about 1 microampere to 100 milliamperes per centimeter and from about 1 to 100 volts potential will be effective.

In some structures, it has been observed that improved performance results from the retention or presence of traces of moisture. For example, the devices of FIGS. 1 and 2 can be slowed in their coloration and bleaching rate by prolonged exposure to a vacuum of $10^{-6}$ Torr. The devices can be restored to normal operation by brief exposure to atmospheric conditions or a moist inert gas.

Variable light transmission exhibited by the devices of the invention, when induced by means other than an electric field, may be partially erased and enhanced by application of an electric field. For example, the molybdenum oxide, tungsten oxide, and copper molybdate films described above are also photochromic and may be colored by irradiation with ultra violet light. When an electric field is thereafter applied as described above, the coloration disappears at the positive electrode but is further enhanced at the negative electrode.

Rate of color induction or erasure, temperature for optimum control of such, and applied voltage may vary depending, for example, on the films and electrodes chosen for use in the devices of the invention. Thus, the invention is not limited by conditions for optimum coloration or modulation of electromagnetic radiation absorption, or by particular materials or geometry of the device, but is to be construed broadly in accordance with the appended claims.

Typical of the many practical applications of the devices of the invention is use as an electrically controlled window glass sun visor for homes or vehicles. For example, window glass may be manufactured from two transparent, stannic oxide coated glass plates ("Nesa" glass) in which the persistent electrochromic layer is between and in contact with the stannic oxide coatings. The electrochromic sun visor effect is obtained by applying a suitable voltage between the two stannic oxide conductive layers so as to color the electrochromic material.

I claim:

1. A device for providing variable absorption of electromagnetic radiation wherein said absorption may be varied from substantially no absorption to a desired degree of absorption and wherein said absorption may be reversed to said substantially non-absorptive state, further where said absorption may be fixed and be persistent at any point from the non-absorptive to the maximum absorptive state, which comprises a thin coherent layer of substantially only a solid persistent electrochromic material, a pair of electrodes in contact with said material, and means for applying direct current voltage to said pair of electrodes to create an electric field across said material, said current being of a polarity which alters light absorption for a time to obtain desired absorption, and then stopped, whereby said desired absorptive state persists.

2. The device of claim 1 wherein said electrochromic material and said electrodes are relatively thin layers and said electrochromic material is sandwiched between said electrodes.

3. The device of claim 2 wherein at least one of said electrodes is substantially transparent.

4. The device fo claim 1 wherein said electrochromic material layer is a film of thickness in the range of about 0.1 to 100 microns.

5. The device of claim 1 wherein said electrochromic material contains at least one element of variable oxidation state.

6. The device of claim 1 wherein said electrochromic material is tungsten oxide, molybdenum oxide, niobium oxide, vanadium oxide, copper molybdate, copper stannate, or cobalt tungstate.

7. The device of claim 6 wherein the electrochromic material is doped with a metal.

8. The device of claim 1 wherein said electrochromic material is tungsten oxide.

9. The device of claim 1 wherein said electrochromic material is molybdenum oxide.

10. The device of claim 1 wherein said electromagnetic radiation is in the visible spectrum.

11. A device for providing variable absorption of electromagnetic radiation wherein said absorption may be varied from substantially no absorption to a desired degree of absorption and wherein said absorption may be reversed to said substantially non-absorptive state, further where said absorption may be fixed and be persistent at any point from the non-absorptive to the maximum absorptive state, which comprises a thin coherent layer of substantially only a solid, persistent electrochromic material, a pair of electrodes in contact with said material, and means for applying direct current voltage to said pair of electrodes to create an electric field across said material, said current being of a polarity which increases absorption, to increase absorption, for a time to obtain desired absorption, and then stopped, whereby said desired absorptive state persists; and means to apply a current of a reverse polarity for a time to obtain a desired decrease in absorption, when such decrease is desired.

* * * * *